United States Patent [19]

Sugimori et al.

[11] Patent Number: 5,592,367
[45] Date of Patent: Jan. 7, 1997

[54] APPARATUS FOR NON-CONTACTING FEEDING OF HIGH FREQUENCY POWER

[75] Inventors: Katsunori Sugimori, Tokyo; Hiroshi Sakamoto, Kumamoto, both of Japan

[73] Assignee: Nippon Electric Industry Co., Ltd., Tokyo, Japan

[21] Appl. No.: 319,368

[22] Filed: Oct. 6, 1994

[30] Foreign Application Priority Data

Jun. 6, 1994 [JP] Japan ................................. 6-147053

[51] Int. Cl.⁶ ................................................ H02M 3/335
[52] U.S. Cl. ................................ 363/17; 363/91; 363/98; 363/136
[58] Field of Search ............................ 363/17, 136, 22, 363/139, 24, 25, 91, 98; 323/310

[56] References Cited

U.S. PATENT DOCUMENTS

| 4,194,238 | 3/1980 | Masaki | 363/17 |
| 4,682,082 | 7/1987 | MacAskill et al. | 315/219 |
| 4,958,268 | 9/1990 | Nagagata et al. | 363/16 |
| 5,225,972 | 7/1993 | Sakamoto | 363/18 |

OTHER PUBLICATIONS

"A Novel Converter for Non-Contact Charging with Electromagnetic Coupling", Hiroshi Sakamoto et al, IEEE Transactions on Magnetics, vol. 29, No. 6, pp. 3228–3230, Nov. 1993.

Primary Examiner—Peter S. Wong
Assistant Examiner—Shawn Riley
Attorney, Agent, or Firm—Jordan and Hamburg

[57] ABSTRACT

The apparatus for non-contacting feeding of a high frequency power according to the present invention comprises a double voltage full-wave rectifier circuit which converts an AC input into a DC output, Royer oscillation circuit consisting of FETs and which receives the DC output from the voltage double full-wave rectifier circuit and provides a high frequency oscillation, the gate windings ofhe FETs being the second winding of a saturable circuit, a starting gate bias stabilization circuit for the Royer oscillation circuit, and a main transformer which delivers a high frequency power produced in the Royer oscillation circuit, through the primary winding of the oscillation-use saturable transformer.

9 Claims, 3 Drawing Sheets

APPARATUS FOR NON-CONTACTING FEEDING OF HIGH FREQUENCY POWER

BACKGROUND OF THE INVENTION

1. Field of the Invention

The present invention relates to an apparatus for non-contacting feeding of a high frequency power developed by a self-excited oscillation circuit, and more particularly, to a non-contacting high frequency power feeding apparatus for use as a non-contacting charger for electric cars, cardiac pace makers, induction-heating cookers, etc.

2. Description of the Prior Art

Heretofore, various ideas have been proposed to reduce the air pollution with the exhaust gases from the cars driven by any petroleum fuel engines and the annoying noise from such engines. One of the ideas is to use in the car an electric motor supplied with a power from rechargeable batteries. In various advanced countries, the research and development of such electric cars are under promotion.

The requirements for a wider prevailing of such electric cars are a more compact design, lighter weight, longer life, higher output of the batteries, etc. as well as a more compact design, lighter weight, shorter charging time, etc. of the charger. At present, electric cars for specific applications are limitedly used in defined areas.

The ordinary battery charger consists of a transformer provided for transformation of a commercial frequency power, and a rectifier circuit, control circuit, etc. provided at the secondary side of the transformer. Among the charger components, the transformer being larger and heavier than the rest cannot be reduced so much in size and weight because it is to operate with a commercial frequency. Therefore, the charger size and weight are still large and the conversion efficiency is low.

In these circumstances, it has been needed to develop a battery charger being compact and lightweight and high conversion efficiency, easy to operate and operable highly economically.

Small, long-life batteries have been developed and used in practice for the cardiac pace makers. However, since they are a primary cell, it has to be replaced with a fresh one before its life comes to end. For this battery replacement, the patient carrying the battery buried in the body must be subject to a surgery in a hospital. The patient cannot avoid such pains and also has many restrictions in the daily life.

SUMMARY OF THE INVENTION

The present invention has an object to overcome the above-mentioned drawbacks of the prior art by providing a compact, lightweight, highly efficient apparatus for non-contacting feeding of a high frequency power.

The above object is accomplished by providing, according to the present invention, an apparatus for non-contacting feeding of a high frequency power, comprising a voltage double full-wave rectifier circuit consisting of two diodes, four capacitors and an inserted resistor; an oscillation-use saturable transformer consisting of a primary winding connected in parallel by means of a resistor to a primary winding of a main transformer and two sets of secondary windings; a Royer oscilation circuit consisting of FETs having gate circuits, respectively, connected to the secondary windings of the saturable transformer through a parallel circuit consisting of a resistor and a diode, and also source terminals and drain terminals, respectively, connected in series to each other; a starting gate bias stabilization circuit for the Royer oscillation circuit, consisting of a series circuit consisting of a resistor and a capacitor, connected in parallel between output terminals of the voltage double full-wave rectifier circuit and two diodes connected to the connect ing point between the resistor and capacitor; and the main transformer having the primary winding thereof inserted between the connecting point of the two capacitors at the output terminals of the voltage double full-wave rectifier circuit and the connecting point of the FETs and delivering at the primary winding thereof through the primary winding of the saturable transformer a high frequency by the Royer oscillation circuit The above object is also accomplished by providing, according to the present invention, non-contacting high frequency power feeding apparatus in which the main transformer has a tertiary winding connected in parallel to the primary winding of the saturable transformer by means of a resistor.

These and other objects and advantages of the present invent ion will be apparent from the ensuing description made, by way of example, of the preferred embodiments with reference to the drawings.

DETAILED DESCRIPTION OF THE PREFERRED EMBODIMENTS

Figure 1:
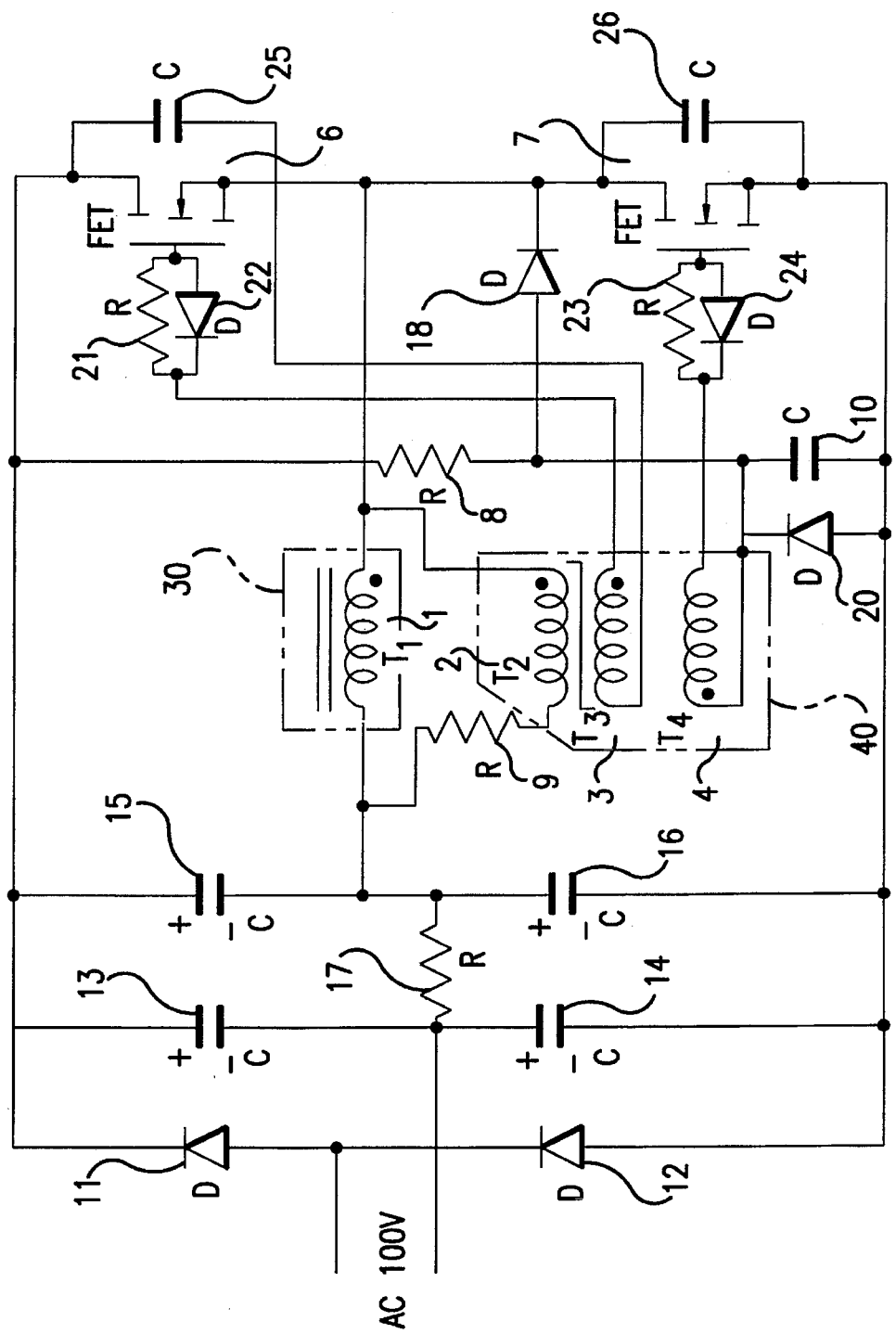
FIG. 1 is block diagram showing the circuit, configuration of a first embodiment of the present invention.

FIG. 1 shows in a block diagram showing the circuit configuration of the first embodiment of the high frequency power non-contacting feeding apparatus.

As shown in FIG. 1, the apparatus comprises an ordinary voltage double full-wave rectifier circuit of two diodes 11 and 12 and two capacitors 13 and 14 and which has connected in series between the output terminals thereof a series circuit of two capacitors 15 and 16. A resistor 17 is connected as interposed between the connecting point of the capacitors 13 and 14 and that of the capacitors 15 and 16. The input power to the rectifier circuit is an AC power of 100 V of a commercial frequency. Receiving this power, the rectifier circuit delivers a DE voltage of±140 V at the output terminal thereof. The rectified positive and negative voltages will have a peak at every half cycle of the commercial frequency, respectively. In case a half bridge circuit is formed from two diodes and two capacitors, there will develop a difference (DC component) between the positive and negative voltages at every half cycle of the commercial frequency in a high frequency AC voltage from an output transformer, which will cause the transformer to be saturated. To avoid this, a voltage double is produced by the two diodes and two capacitors and then halved by two more capacitors connected in parallel to the diodes and capacitors.

In the self-excited oscillation circuit such as the Royer oscillation circuit, the voltage at the connecting point of two capacitors forming together a half bridge circuit will deviate in one direction and the oscillation be stopped in some cases at the time of start, at application of a heavy load or at any sudden change of operating conditions. To avoid this, the resistor 17 is connected between the first connecting point of the two capacitors 13 and 14 of the voltage double full-wave rectifier circuit and that of the two capacitors 15 and 16 forming together following the half bridge circuit. Normally, little current will flow through the resistor 17 since the voltages at the two connecting points are generally equal to each other. If the voltage at the connecting point of the two capacitors of the half bridge deviates in one direction for any reason, a current will flow through the resistor 17 for the voltages in the two capacitors to be equal to each other. After return to the normal operation, little current will flow through the resistor 17 again.

The apparatus according to the present invention further comprises a main transformer 30 having a primary winding 1 connected between the connecting point of the two capacitors 15 and 16 in the output terminals of the voltage double full-wave rectifier circuit and the connecting point between the source terminal of the FET 6 and the drain terminal of the FET 7, both FETs 6 and 7 forming together the Royer oscillation circuit. Further, a saturable transformer 40 is provided which has a primary winding 2 connected in parallel by means of a resistor 9 between the opposite ends of the primary winding 1 of the main transformer 30. The saturable transformer 40 has secondary windings 3 and 4 that form gate windings of the FETs 6 and 7 forming together the Royer oscillation circuit.

A high frequency power developed in the Royer oscillation circuit is delivered at the primary winding 1 of the main transformer 30. The main transformer 30 may be provided with an output winding at the secondary side thereof to change the output voltage as necessary. However, in case the apparatus according to the present invention is used for an electromagnetic cooker, the secondary side of the main transformer 30 is a pan made of iron or iron alloy. The saturable transformer 40 is used for the oscillation in the Royer oscillation circuit, so it has the two secondary windings 3 and 4 which serve as the gate windings of the FETs 6 and 7. The polarities of the secondary windings 3 and 4 are determined for the FETs to be driven with a positive feedback.

The oscillation frequency of the high frequency power developed by the Royer oscillation circuit can be given in the following expression:

$$f = E_i / 4N\phi \tag{1}$$

where $E_i$: Input source voltage, N: No. of turns of the primary winding of the saturable transformer 40, and $\phi$: Saturation magnetic flux of magnetic core of the saturable transformer 40.

A high frequency power determined using the expression (1) and developed in the Royer oscillation circuit formed from the FETs 6 and 7 is transmitted to the primary winding 2 of the saturable transformer 40 through the secondary windings 3 and 4 of the saturable transformer 40 and further delivered in a non-contacting manner at the primary winding 2 through the primary winding 1 of the main transformer 30.

The two FETs 6 and 7 forming the Royer oscillation circuit have the source terminals and drain terminals thereof, respectively, connected to each other while the drain terminal of the FET 6 and source terminal of the FET 7 are connected in parallel to the output terminal of the voltage double full-wave rectifier circuit.

The gate terminal of the FET 6 is connected to one end of the secondary winding 3 of the saturable transformer 40 through a parallel circuit consisting of a resistor 21 and a diode 22, and the gate terminal of the FET 7 is connected to one end of the secondary winding 4 of the saturable transformer 40 through a parallel circuit consisting of a resistor 23 and a diode 24.

For the Royer oscillation circuit formed from the FETs 6 and 7, start ing circuit is required since the gate threshold voltage for the FETs is several volts. Therefore, a series circuit consisting of a resistor 8 and a capacitor 10 is connected in parallel to the drain terminal of the FET 6 and source terminal of the FET 7. A diode 18 is provided of which the anode terminal is connected to the connecting point of the resistor 8 and capacitor 10 while the cathode terminal connected to the connecting point of the FETs 6 and 7.

When the power is supplied to the apparatus, the capacitor 10 is charged through the resistor 8 and the gate voltage of the FET 7 increases. When the gate voltage attains the threshold voltage, the FET 7 turns on and an oscillation is started due to the positive feedback through the winding of the saturable transformer 40. If the voltage in the capacitor 10 continuously increases, it will possibly exceed the withstand voltage of the FET 7. To avoid this, a diode 18 is provided as interposed between the connecting point of the capacitor 10 and resistor 8 and that of the FETs 6 and 7. In the previously mentioned starting gate bias stabilization circuit, the voltage between the drain and source of the FET 7 becomes nearly zero when the FET 7 turns on. So, the charge in the capacitor 10 is discharged through the diode 19 and decreases to nearly zero. However, the oscillation will be satisfactorily held due to the positive feedback through the winding of the saturable transformer 40. When the FET 7 turns on, the mirror effect of the FET or parasitic capacity of the diode 18 will cause a negative charge to be cumulated in the capacitor 10, possibly developing a high negative voltage. To avoid this, a diode 20 is connected in parallel to the capacitor 10.

For an ideal soft switching, a high speed gate driving circuit for rapidly turning off the FETs, and a reactive current and dead time having appropriate magnitudes, respectively, at the time of commutation, are required.

In the non-contacting high frequency power feeding apparatus according to the present invention, the reactive current necessary for the soft switching necessarily exists as a leakage inductance of the main transformer 30. The driving conditions for the soft switching are implemented by the resistor 9 connected between the windings of the main transformer 30 and saturable transformer 40, respectively, resistors 21 and 22 and diodes 22 and 24 connected to the gate terminals of the FETs 6 and 7, respectively, and saturation inductance of the two secondary windings of the saturable transformer 40, that form together the gate winding.

First, when the saturable magnetic core is not yet saturated, the positive feedback through the winding of the saturable transformer 40 causes a voltage of about 18 to 20 V to be applied to the gate of one of the FETs and thus a complete conduction is kept between the drain and source of the FET. When the saturable transformer 40 is saturated, the impedance of the gate winding abruptly decreases, there occurs a resonance with a capacitance between the gate and source of the FET, and the charge in the gate is rapidly discharged through the diode connected to the gate terminal.

The gate of the other FET is about to be charged following the above process due to the resonance, however, the resistor connected to the gate inhibits any rapid charging in the capacitance between the gate and source, and the two FETs are turned off simultaneously.

For this while, the parasitic capacitance of the switching element and the like prevents the FET voltage from suddenly changing so that the FET is turned off only with a small loss. Then, the energy of the leakage inductance of the main transformer 30 causes a parallel capacitance of two FETs to be charged and discharged so that the commutation is completed with both the switching elements turned off. Thus the switching loss is minimized.

The gate winding is applied with a voltage inverted by the soft switching, the increase of gate voltage at the other FET is gentle due to the influence of the resistor connected to that gate and the capacitance between the gate and source, and the FET is turned on.

Since voltages developed in the winding of the main transformer 30 and in the winding of the saturable transformer 40, respectively, during saturation of the magnetic core of the saturable transformer 40 are different from those developed in these windings during FET commutation (the voltage of the saturable magnetic core changes with the saturation while the voltage of the main transformer 30 changes after the commutation), any direct connection between these windings will cause an excessively large current to flow, causing a large loss. To solve this problem, the resistor 9 is connected in series.

Next, the relation among the output voltage, maximum transmittable power, leakage inductance and frequency in the non-contact ing high frequency power feeding apparatus accord ing to the present invention, will be described in the following.

Figure 3:
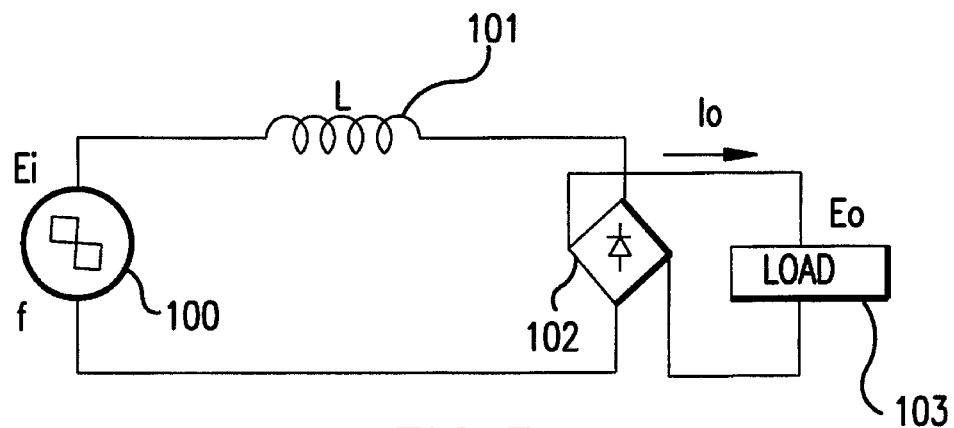
FIG. 3 is a schematic diagram of the simplified equivalent circuit of the present invention.

FIG. 3 is a schematic diagram of the simplified equivalent circuit of the present invention In the Figure, $E_i$ is the amplitude of a rectangular wave produced by the half bridge, f a frequency, L leakage inductance, $I_o$ a load current and $E_o$ an output voltage. The relation among $E_i$, f, L, $I_o$ and $E_o$ determined from the equivalent circuit is given as the following expression:

$$E_o = [E_i^2 - 4fE_iLI_o]^{1/2} \quad (2)$$

Figure 4:
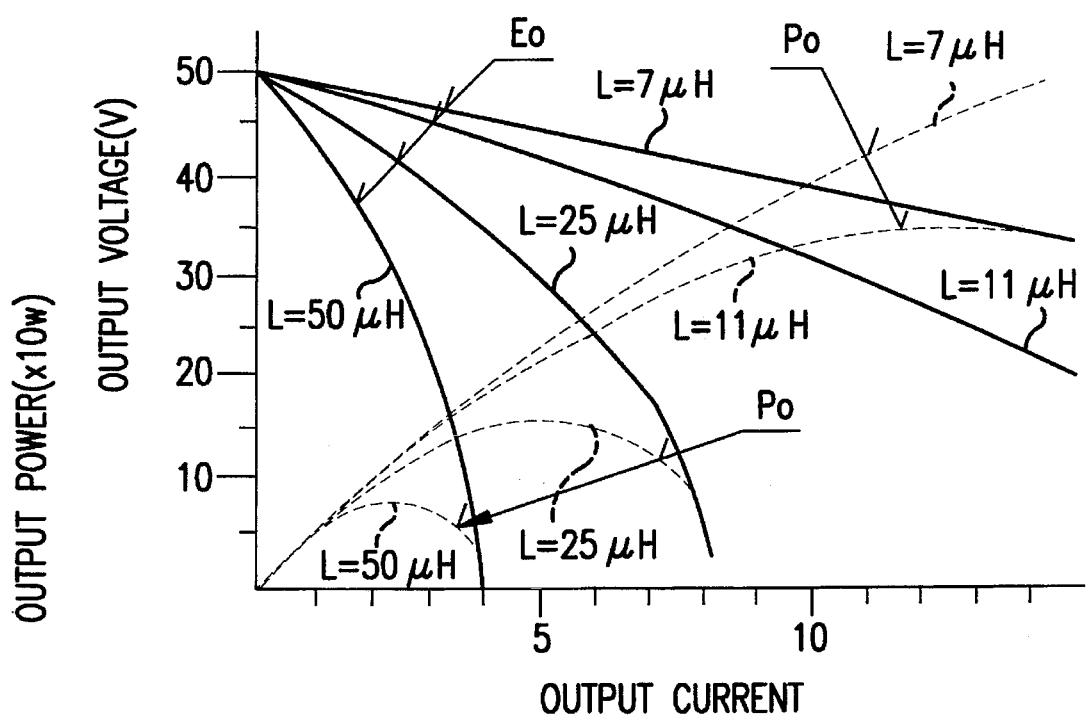
FIG. 4 is a characteristic curve showing the relations among the output voltage, output current and output power.

The output power $P_o$ can be easily calculated from relation $P_o = E_o I_o$. The relation among $E_o$, $I_o$ and $P_o$ is as shown in FIG. 4.

The output voltage $E_o$ can be controlled with a magnetic amplifier or the like connected to the secondary side. However, the output voltage $E_o$ varies as a function of the frequency f as in the expression (2). By controlling the frequency f with the in oscillation-use magnetic core changed in size, shape, etc., the output voltage $E_o$ can be easily controlled.

Figure 2:
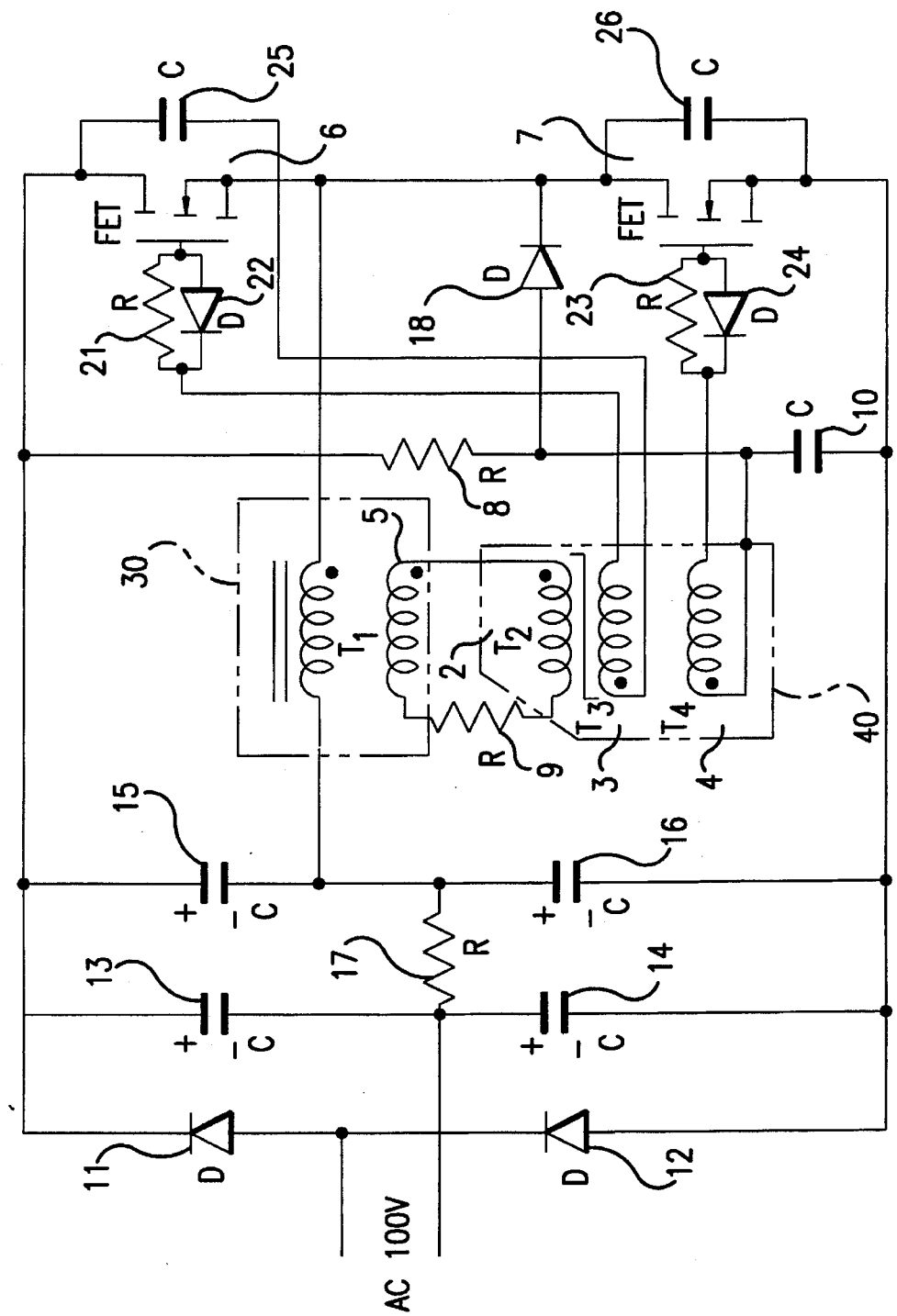
FIG. 2 is also a block diagram showing the circuit configuration of a second embodiment of the present invention.

FIG. 2 is a block diagram showing the circuit configuration of a second embodiment of the present invention. In this embodiment, the main transformer is provided with a tertiary winding 5 of which both the ends are connected in parallel to the primary winding 2 of the saturable transformer 40 by means of the resistor 9.

In the first embodiment shown in FIG. 1, the main transformer 30 and saturable transformer 40 are composed of independent circuits, respectively, while in the second embodiment shown in FIG. 2, the voltage from the main transformer 30 is applied to the saturable transformer 40.

As having been described in the foregoing, the non-contacting high frequency power feeding apparatus according to the present invention comprises the voltage double full-wave rectifier circuit, Royer oscillation circuit using FETs, saturable transformer serving as the gate winding of the FETs, and the main transformer 30 delivering a high frequency power at the primary winding thereof through the primary winding of the saturable transformer 40. The main transformer 30 and saturable transformer 40 are both a high frequency transformer, and thus they can be designed compact and lightweight. Also the circuit configuration of the apparatus is simple, the circuit incurs only a little power loss and the transmission loss is ignorable because of the non-contact ing feeding of high frequency power.

That is, a highly efficient, compact and lightweight, non-contacting high frequency power feeding apparatus according to the present invention can be used as a non-contacting charger for electric cars, charger for cardiac pace maker, induction-heating cooker and the like.

What is claimed is:

1. An apparatus for wireless feeding of a high frequency power, the apparatus comprising:

a voltage doubler full-wave rectifier circuit including a bridge circuit having:
a series circuit of two diodes (11) and (12), a first series circuit of two capacitors (13) and (14) and a second series circuit of two capacitors (15) and (16) all connected in parallel with one another, and
a resistor (17) connecting a first series junction of said first series circuit of two capacitors with a second series junction of said second series circuit of two capacitors;

a main transformer having a primary winding (1);

a saturable transformer having a primary winding (2) connected in series to a resistor, the series connection of the primary winding (2) and the resistor being connected in parallel with the primary winding (1) of the main transformer, and the saturable transformer further having first and second secondary windings (3) and (4);

a Royer oscillation circuit having first and second FETs (6) and (7) having respective first and second gate circuits, respectively, connected to first and second ends of the first and second secondary windings (3) and (4), respectively, of the saturable transformer through first and second parallel circuits composed of a resistor and a diode, a second end of said first secondary winding (3) being connected to a source terminal of the first FET (6), the source terminal of the first FET (6) further being connected to a drain terminal of the second FET (7) while a drain terminal of the first FET (6) and a source terminal of the second FET (7) are respectively connected to positive and negative output terminals of the voltage doubler full-wave rectifier circuit, said first and second FETs (6) and (7) respectively having first and second channel capacitors (25) and (26) connected in parallel with channels of said first and second FETs (6) and (7);

a starting gate bias stabilization circuit having a series circuit composed of a resistor (8) and a capacitor (10) connected across the positive and negative output terminals of the voltage doubler full-wave rectifier circuit, a diode (18) connecting a junction of the resistor (8) and the capacitor (10) to the junction of the source terminal of the first FET (6) and the drain terminal of the second FET (7), a diode (20) connected in parallel with the capacitor (10), and a second end of said second secondary winding (4) being connected to the junction of said resistor (8) and the capacitor (10); and the main transformer having the primary winding (1) connected at a first end to the second series junction of said second series circuit of two capacitors of the voltage doubler full-wave rectifier circuit and at a second end to the junction of the source terminal of the first FET (6) and the drain terminal of the second FET (7), the primary winding (1) of the main transformer having a high frequency power signal driven therethrough by the Royer oscillation circuit and coupled to the primary winding (2) of the saturable transformer to provide feedback for the Royer oscillation circuit.

2. An apparatus according to claim 1, wherein the main transformer is provided with a tertiary winding (5) having a resistor provided at one end thereof, the primary winding (2) of the saturable transformer being connected in parallel across the resistor and the other end of the tertiary winding (5).

3. An apparatus according to claim 1, wherein the first and second FETs are replaced by one of UJTs or IGBTs.

4. A switching apparatus comprising:

first and second FETs serially connected at a junction of a source terminal of the first FET and a drain terminal of the second FET to form a switched terminal;

said first and second FETs having respective drains and sources respectively connected to positive and negative potentials and first and second commutation capacitors connected in parallel across respective ones of said first and second FETs;

a main transformer having a primary winding connected between said switched terminal and a neutral potential for receiving a high frequency power signal from said positive and negative potentials as switched by said first and second FETs; and feedback means for coupling a signal from said primary winding to gates of said first and second FETs to alternately switch on and off said first and second FETs such that a dead time exists when neither said first nor said second FET is in a conductive state and during which said first and second commutation capacitors conduct current to said switched terminal.

5. The apparatus according to claim 4 wherein said feedback means comprises:

a saturable transformer having a primary winding coupled to said primary winding of said main transformer and first and second secondary windings;

said first secondary winding having a first end coupled to a gate of said first FET via a first parallel combination of a resistor and a diode and a second end coupled to said source terminal of said first FET, said first secondary winding having an impedance during saturation of said saturable transformer and said first FET having a gate-source capacitance creating a resonance facilitating rapid discharge of said gate of said first FET;

said second secondary winding having a second end coupled to a gate of said second FET via a second parallel combination of a resistor and diode and a first end coupled to said source terminal of said second FET, said second secondary winding having an impedance during saturation of said saturable transformer and said first FET having a gate-source capacitance creating a resonance facilitating rapid discharge of said gate of said first FET; and said first and second secondary windings being coupled to said gates of said first and second FETs in opposite polarities to facilitate positive feedback from said primary winding of said main transformer.

6. The apparatus according to claim 5 further comprising:

a voltage doubler rectifier circuit having a rectifying portion with positive and negative outputs for supplying said positive and negative potentials;

a first pair of serially connected capacitors connected across said positive and negative outputs;

a second pair of serially connected capacitors connected across said positive and negative outputs;

an equalizing resistor connecting a junction of the first pair of serially connected capacitors with a junction of the second pair of serially connected capacitors to equalize voltages as said junctions of said first and second pairs of serially connected capacitors; and said junction of the second pair of serially connected capacitors providing said neutral potential to said primary winding of said main transformer.

an oscillator circuit having a power transformer with a primary winding, first and second FETs serially connected at a junction of a source terminal of the first FET and a drain terminal of the second FET to form a switched terminal of said oscillator circuit, and feedback means for applying positive feedback to first and second gates of said first and second FETs; and said first and second FETs having respective drains and sources connected to respective ones of said positive and negative outputs of said voltage doubler rectifier circuit, said primary winding being connected between said junction of said second pair of serially connected capacitors and said switched terminal of said oscillator circuit for receiving a high frequency power signal switched by said first and second FETs, and said feedback means being coupled to said primary winding and first and second gates of said first and second FETs to apply positive feedback from said primary winding to maintain oscillation of said oscillator circuit.

7. The apparatus according to claim 4 further comprising:

a voltage doubler rectifier circuit having a rectifying portion with positive and negative outputs for supplying said positive and negative potentials;

a first pair of serially connected capacitors connected across said positive and negative outputs;

a second pair of serially connected capacitors connected across said positive and negative outputs;

an equalizing resistor connecting a junction of the first pair of serially connected capacitors with a junction of the second pair of serially connected capacitors to equalize voltages as said junctions of said first and second pairs of serially connected capacitors; and said junction of the second pair of serially connected capacitors providing said neutral potential to said primary winding of said main transformer.

8. A switching apparatus comprising:

first and second FETs serially connected at a junction of a source terminal of the first FET and a drain terminal of the second FET to form a switched terminal;

said first and second FETs having respective drains and sources respectively connected to positive and negative potentials;

a main transformer having a primary winding connected between said switched terminal and a neutral potential for receiving a high frequency power signal from said positive and negative potentials as switched by said first and second FETs;

feedback means for coupling a signal from said primary winding to gates of said first and second FETs to alternately switch on and off said first and second FETs such that a dead time exists when neither said first nor said second FET is in a conductive state and during which said first and second commutation capacitors conduct current to said switched terminal;

said feedback means including a saturable transformer having a primary winding coupled to said primary winding of said main transformer and first and second secondary windings;

said first secondary winding having a first end coupled to a gate of said first FET via a first parallel combination of a resistor and diode and a second end coupled to said source terminal of said first FET, said first secondary winding having an impedance during saturation of said saturable transformer and said first FET having a gate-source capacitance creating a resonance facilitating rapid discharge of said gate of said first FET;

said second secondary winding having a second end coupled to a gate of said second FET via a second parallel combination of a resistor and a diode and a first end coupled to said source terminal of said second FET, said second secondary winding having an impedance during saturation of said saturable transformer and said first FET having a gate-source capacitance creating a resonance facilitating rapid discharge of said gate of said first FET; and said first and second secondary windings being coupled to said gates of said first and second FETs in opposite polarities to facilitate positive feedback from said primary winding of said main transformer.

9. A switching apparatus comprising:

first and second FETs serially connected at a junction of a source terminal of the first FET and a drain terminal of the second FET to form a switched terminal;

said first and second FETs having respective drains and sources respectively connected to positive and negative potentials;

a main transformer having a primary winding connected between said switched terminal and a neutral potential for receiving a high frequency power signal from said positive and negative potentials as switched by said first and second FETs;

feedback means for coupling a signal from said primary winding to gates of said first and second FETs to alternately switch on and off said first and second FETs such that a dead time exists when neither said first nor said second FET is in a conductive state;

a voltage doubler rectifier circuit having a rectifying portion with positive and negative outputs for supplying said positive and negative potentials;

a first pair of serially connected capacitors connected across said positive and negative outputs;

a second pair of serially connected capacitors connected across said positive and negative outputs;

an equalizing resistor connecting a junction of the first pair of serially connected capacitors with a junction of the second pair of serially connected capacitors to equalize voltages said junctions of said first and second pairs of serially connected capacitors; and said junction of the second pair of serially connected capacitors providing said neutral potential to said primary winding of said main transformer.

* * * * *